UNITED STATES PATENT OFFICE.

JAMES PLINY PERKINS, OF YONKERS, NEW YORK.

PROCESS OF TREATING SLAG FOR THE PRODUCTION OF RED PIGMENTS.

SPECIFICATION forming part of Letters Patent No. 429,055, dated May 27, 1890.

Application filed April 19, 1889. Renewed March 6, 1890. Serial No. 342,915. (No specimens.)

*To all whom it may concern:*

Be it known that I, JAMES PLINY PERKINS, a citizen of the United States, residing at Yonkers, in the county of Westchester and State of New York, have invented certain new and useful Improvements in Processes of Treating Slag for the Production of Red Pigments; and I do hereby declare the following to be a full, clear, and exact description of the invention, such as will enable others skilled in the art to which it appertains to make and use the same.

My invention consists in the process, hereinafter to be described and claimed, of treating silicious ferruginous slags for the production of red pigments.

By the application of my process a variety of bright-red pigments of the most pronounced color are produced. These colors belong to the class commonly known as "Venetian reds." The silicious ferruginous slag which I employ as the raw material in my process is most commonly found as a by-product in the manufacture and working of wrought-iron, though it may be produced in other ways in a form suitable for the application of my process. The best quality of this slag is produced in puddling and reheating furnaces. It is nearly black in color, of great specific gravity, and consists of a nearly-pure silicate of iron mixed with ferrous oxide. This slag, as above described, I pulverize in any suitable pulverizing apparatus to a degree of fineness known in the art as "one hundred and ninety mesh," or less. It is not necessary that it should be pulverized to a degree finer than that, and my process may be carried out with a fair degree of success with slag ground to a lesser degree of fineness than that mentioned.

The second step in my process consists in treating the slag, pulverized as above described, with sulphuric acid. The acid may be mixed with the pulverized slag in the ordinary way by stirring with spades or paddles, or in any suitable mechanical mixer or mixing-machine. The amount of sulphuric acid to be mixed with a given quantity of pulverized slag varies according to the quality of the slag and the particular shade of color which it is desired the resulting pigment shall present. In general, however, I find that with the average slag and the average quality of acid the best results are obtained when the proportion, by weight, of the acid to the slag is as one to three. In certain cases, however, a higher proportion of acid than that of one to three may be necessary. The acid may be used undiluted, in its commercial form of oil of vitriol, or it may be diluted with water, and I prefer this method of applying it, as its action is slower, more moderate, and more uniformly diffused through the mass of pulverized slag. When undiluted, the action of the acid is intense, local, and uneven. It attacks too violently those particles with which it first comes in contact, and being absorbed by these does not get to other particles. Another method of obtaining the same effect as that resulting from the dilution of acid is to dampen or moisten the pulverized slag with the given quantity of water before applying the undiluted acid. The result is obviously the same, though the preferable method is to dilute the acid first and then apply the dilute solution to the dry pulverized slag. The perceptible effects of this the second step in my process are the liberation of heat and the caking or the solidification of the mass of slag. What was formerly a fine powder becomes a solid mass, though brittle and easily broken up. The color of the mass changes from the dark shade which the slag had after pulverization to a gray or whitish tinge. If water is used to dilute the acid, as above described, a considerable quantity of steam is given off during this step in my process, and if acid is used in undiluted form a certain amount of steam is still given off during this step of the process.

The third step in my process consists in heating the substance produced by the steps hereinbefore described to a red heat in any suitable furnace. The caked mass remaining after the completion of the second step in the process should be broken up, so as to be capable of convenient handling and introduction into the furnace. The furnace should be so constructed to admit of the escape of the fumes given off on heating the charge and to allow access of air when desired. The result of my process of treating slags of the nature described in the manner above set out is a bright-red pigment of the most desirable of those shades known as "Venetian red." The pigment is of a soft nature and can easily be ground to an impalpable smooth powder. This pigment has strong and lasting coloring powers, it mixes and blends easily with other pigments, and grinds perfectly with oil. The ground pigment is free from grit and of unusual smoothness.

The above is a full description of my process of treating silicious ferruginous slag in order to produce red pigments, and my invention, as it has been hereinbefore described and as it will be hereinafter claimed, is independent of the question of the chemical composition of the pigment, and is equally independent of the question of what chemical reactions occur in the various steps of the process. Chemical analyses of the resulting product of my process of treating slag tend to show, however, that it consists of an intimate mixture of ferric oxide and separated or precipitated silica, and it is believed that the reactions which take place during the process are the following:

The sulphuric acid in the second step of the process attacks the ferrous silicate, which is the main constituent of the slag, forming ferrous sulphate and silica. The action of the heat in the third step of the process decomposes the ferrous sulphate, leaving behind ferric oxide as a bright red powder. Any residue of the ferrous oxide of the slag which may not have been attacked by the sulphuric acid, and which has remained unchanged intermixed with the ferrous sulphate, is at the same time set free by the decomposition of the sulphate by heat and is also oxidized to ferric oxide, probably by the combined action of the sulphuric acid and sulphuric trioxide set free on heating the ferrous sulphate. During the application of heat in the third step of the process sulphuric dioxide gas passes off in fumes.

As before stated, the shade of color in the pigments produced by this process may be varied by varying the amount of sulphuric acid used, the brighter reds being produced when the larger quantity of acid is used and the darker ones when a less quantity of acid is used, and it is believed that this is due to the fact that when the lesser quantity of acid is used the reactions are not sufficiently general and powerful to attack all the slag, and a certain quantity exists unchanged, as ferrous silicate, in the resulting pigment, imparting its dark color thereto.

The pigments produced by my process are brighter and more pronounced in color, and are more homogeneous in composition than any that can be made by the mixture of the ordinary Venetian reds with the ground silicate, and it is believed that this is due to the fact that my process produces a mixture of ferric oxide with silica in the separated or precipitated and extremely fine condition which it assumes when it is set free from certain silicates decomposable by acids and then heated. In the separated or precipitated condition silica is finer and more pulverulent than it can be when produced by the most complete grinding of quartz rock or quartzose mineral, for the particles thus obtained by grinding will consist of particles of large crystals in the crystalline condition; also, separated or precipitated silica is opaque, while the minute particles of crystals or crystalline rock obtained by grinding would be transparent or translucent. Consequently it is believed that this is the reason why the pigments produced by my process are so much more pronounced in color than the weaker lighter shades produced by mixing ordinary Venetian reds with ground silica. Separated or precipitated silica has, furthermore, a much greater power to hold or bind colors than crystalline silica.

Separated or precipitated silica is apparently neutral so far as concerns the dimming or affecting the color of the ferric oxide with which it is mixed in the proportions resulting from the operation of my process. While not prepared to give a positive reason for this result, I am inclined to believe that it is due to the fact that the separated or precipitated silica is in so finely comminuted a condition that it to a large degree occupies the interstices between the particles of ferric oxide without separating the latter, and thereby diffusing the coloring-matter, as do the larger particles of crystalline silica produced by the ordinary process of grinding.

Having therefore described my invention, what I claim as new, and desire to protect by Letters Patent, is—

The process of treating silicious ferruginous slags for the production of pigments, which consists in, first, pulverizing the slag; second, treating it with sulphuric acid, and, third, applying heat to the mass, all substantially as described.

In testimony whereof I affix my signature in presence of two witnesses.

JAMES PLINY PERKINS.

Witnesses:
G. W. BALLOCH,
W. HENRY WALKER.